United States Patent
Furrer

(10) Patent No.: US 9,046,101 B2
(45) Date of Patent: Jun. 2, 2015

(54) GEAR PUMP HAVING GROOVED MOUNTING ADAPTER

(71) Applicant: Caterpillar Inc., Peoria, IL (US)

(72) Inventor: Randall Edward Furrer, Hanna City, IL (US)

(73) Assignee: Caterpillar Inc., Peoria, IL (US)

( * ) Notice: Subject to any disclaimer, the term of this patent is extended or adjusted under 35 U.S.C. 154(b) by 136 days.

(21) Appl. No.: 13/873,764

(22) Filed: Apr. 30, 2013

(65) Prior Publication Data

US 2014/0308150 A1  Oct. 16, 2014

Related U.S. Application Data

(60) Provisional application No. 61/810,952, filed on Apr. 11, 2013.

(51) Int. Cl.
| | | |
|---|---|---|
| F04C 15/00 | (2006.01) | |
| F04C 2/08 | (2006.01) | |
| F04C 18/18 | (2006.01) | |
| F16D 48/02 | (2006.01) | |
| F04C 23/00 | (2006.01) | |

(52) U.S. Cl.
CPC ............. *F04C 15/0049* (2013.01); *F04C 2/084* (2013.01); *F16D 25/14* (2013.01); *Y10T 403/22* (2015.01); *F04C 23/001* (2013.01); *F04C 2/086* (2013.01); *F04C 18/18* (2013.01); *F04C 2230/604* (2013.01); *F04C 2240/30* (2013.01); *F04C 2250/102* (2013.01)

(58) Field of Classification Search
USPC ......... 418/180, 206.4, 15, 210, 209, 215, 216
See application file for complete search history.

(56) References Cited

U.S. PATENT DOCUMENTS

| | | | | |
|---|---|---|---|---|
| 2,412,588 | A | * | 12/1946 | Lauck .............................. 418/15 |
| 2,820,416 | A | * | 1/1958 | Compton ...................... 418/180 |
| 3,204,564 | A | * | 9/1965 | Eltze .............................. 418/180 |
| 3,472,023 | A | * | 10/1969 | Gimmler ....................... 418/200 |
| 4,231,726 | A | * | 11/1980 | Cobb et al. ................. 418/206.5 |
| 4,355,964 | A | * | 10/1982 | Rodibaugh et al. ........ 418/206.1 |
| 4,560,333 | A | * | 12/1985 | Fujiwara et al. ............. 418/180 |
| 4,655,099 | A | * | 4/1987 | Hansen ....................... 74/421 A |
| 4,676,116 | A | * | 6/1987 | Nerstad et al. .................. 74/360 |
| 4,725,211 | A | * | 2/1988 | Gray ........................... 418/206.4 |
| 5,290,153 | A | * | 3/1994 | Schmidt ........................ 417/216 |
| 6,033,197 | A | | 3/2000 | Brown et al. |
| 6,210,138 | B1 | * | 4/2001 | Cortez ....................... 418/206.4 |
| 6,312,241 | B1 | * | 11/2001 | Kamamoto et al. ........ 418/206.4 |
| 2002/0048525 | A1 | * | 4/2002 | Rushen et al. ............. 418/206.1 |

FOREIGN PATENT DOCUMENTS

| | | |
|---|---|---|
| EP | 2022985 | 2/2009 |
| GB | 857046 | 12/1960 |

* cited by examiner

*Primary Examiner* — Mary A Davis
(74) *Attorney, Agent, or Firm* — Finnegan, Henderson, Farabow, Garrett & Dunner, LLP

(57) ABSTRACT

A mounting adapter is disclosed for use with a gear pump. The mounting adapter may have a generally plate-like base member, and inlet and outlet ports both formed in the base member. The mounting adapter may also have a first bearing bore formed in the base member between the inlet port and the outlet port and configured to receive a first gear shaft, and a first bleed groove formed in the base member adjacent the outlet port. The first bleed groove may be generally concentric with the first bearing bore. The mounting adapter may further have a second bearing bore formed in the base member between the inlet port and the outlet port and configured to receive a second gear shaft, and a second bleed groove formed in the base member adjacent the outlet port. The second bleed groove may be generally concentric with the second bearing bore.

22 Claims, 4 Drawing Sheets

GEAR PUMP HAVING GROOVED MOUNTING ADAPTER

RELATED APPLICATIONS

This application is based on and claims the benefit of priority from U.S. Provisional Application No. 61/810,952, filed Apr. 11, 2013, the contents of which are expressly incorporated herein by reference.

TECHNICAL FIELD

The present disclosure relates generally to a gear pump, and more particularly, to a gear pump having a grooved mounting adapter.

BACKGROUND

A gear pump includes one or more sets of intermeshing gears disposed on separates shafts within a common housing. An external power source, such as an engine, drives one of the shafts to rotate the intermeshing gears. Low-pressure fluid is fed into a disengaging side of the gears, and the rotation of the gears traps the fluid between teeth of the gears and inner cylindrical walls of the housing. The fluid is transported around the inner cylindrical walls by the gear teeth to a high-pressure outlet of the pump, where the fluid is then forced out of the gear teeth by re-engagement of the gears. A pressure of the fluid at the outlet is a result of a rotational speed of the gears and a restriction placed on the fluid at locations downstream of the gears.

In some situations, the fluid pressure at the outlet of the pump can be high-enough to cause air bubbles trapped in the fluid to implode. This implosion (a.k.a., cavitation), if left unchecked, can cause fluid delivery instabilities, excessive noise, and premature failure of fluid system components.

One attempt to address cavitation within a gear pump is disclosed in U.S. Pat. No. 6,033,197 that issued to Brown et al. on May 7, 2000 ("the '197 patent"). In particular, the '197 patent discloses a gear pump housing having bleed slots located adjacent to an outlet passage of the pump. The bleed slots are arcuate, and decrease in size along their arc length. The bleed slots are machined into a body of the housing and function to bring fluid transported by gears of the pump gradually up to the pressure found at the outlet passage. This gradual increase in pressure reduces a size of air bubbles trapped in the fluid prior to implosion, such that when the bubbles do implode at the outlet passage, a magnitude of the implosion is smaller.

While the pump of the '197 patent may provide for gradual pressure increase and reduced cavitation, it may still be less than optimal. In particular, it may be difficult in some applications to find the space within the pump body to machine the bleed slots. In these applications, walls of the body may be weakened by the machining process and/or it may not even be possible to machine the slots. In addition, the geometry of the disclosed bleed slots may be difficult and/or costly to reproduce at other locations of the pump housing.

The disclosed pump and mounting adapter are directed to overcoming one or more of the problems set forth above and/or other problems of the prior art.

SUMMARY

In one aspect, the present disclosure is directed to a mounting adapter for a gear pump. The mounting adapter may include a generally cylindrical base member, an inlet port formed in the base member, and an outlet port formed in the base member. The mounting adapter may also include a first bearing bore formed in the base member between the inlet port and the outlet port and configured to receive a first gear shaft, and a first bleed groove formed in the base member adjacent the outlet port. The first bleed groove may be generally concentric with the first bearing bore. The mounting adapter may further include a second bearing bore formed in the base member between the inlet port and the outlet port and configured to receive a second gear shaft, and a second bleed groove formed in the base member adjacent the outlet port. The second bleed groove may be generally concentric with the second bearing bore.

In a second aspect, the present disclosure is directed to a gear pump. The gear pump may include a housing body forming a first gear chamber and a second gear chamber. The pump may also include a first shaft disposed within the first gear chamber, a first gear supported by the first shaft, a second shaft disposed within the second gear chamber, and a second gear supported by the second shaft and configured to mesh with the first gear. The pump may further include a mounting adapter removably connected to an end of the housing body to at least partially enclose the first shaft, the first gear, the second shaft, and the second gear. The mounting adapter may have a generally cylindrical base member, an inlet port formed in the base member at one side of the first and second gears, and an outlet port formed in the base member at an opposing side of the first and second gears. The mounting adapter may also have a first bearing bore formed in the base member between the inlet port and the outlet port and configured to receive the first shaft, and a first bleed groove formed in the base member adjacent the outlet port. The first bleed groove may be generally concentric with the first bearing bore. The mounting adapter may further have a second bearing bore formed in the base member between the inlet port and the outlet port and configured to receive the second shaft, and a second bleed groove formed in the base member adjacent the outlet port. The second bleed groove may be generally concentric with the second bearing bore. The pump may also include a seal disposed at an interface of the housing body and the mounting adapter.

In a third aspect, the present disclosure is directed to a transmission system. The transmission system may include an input shaft, an output shaft, and at least one clutch disposed between the input and output shafts. The at least one clutch may be selectively actuated to adjust a speed-to-torque ratio of the output shaft relative to the input shaft. The transmission system may further include a sump, and a pump configured to draw fluid from the sump and generate a pressurized flow of fluid directed to the at least one clutch. The pump may have a housing body forming a first gear chamber and a second gear chamber. The pump may also have a first shaft supporting a first gear within the first gear chamber, a second shaft supporting a second gear within the second gear chamber, and a mounting adapter removably connected to an end of the housing body. The mounting adapter may include a generally cylindrical base member connected to the housing body, a generally plate-like mounting flange configured to mount the base member within the transmission, an inlet port formed in the base member at one side of the first and second gears, and an outlet port formed in the base member at an opposing side of the first and second gears. The mounting adapter may also include first and second bearing bores formed in the base member between the inlet and outlet ports and configured to receive the first and second shafts, respectively, and first and second bleed grooves formed in the base member adjacent the outlet port. The first and second bleed grooves may be generally concentric with the first and second bearing bores, respectively. The pump may further include a seal disposed at an interface of the housing body and the mounting adapter.

DETAILED DESCRIPTION

Figure 1:
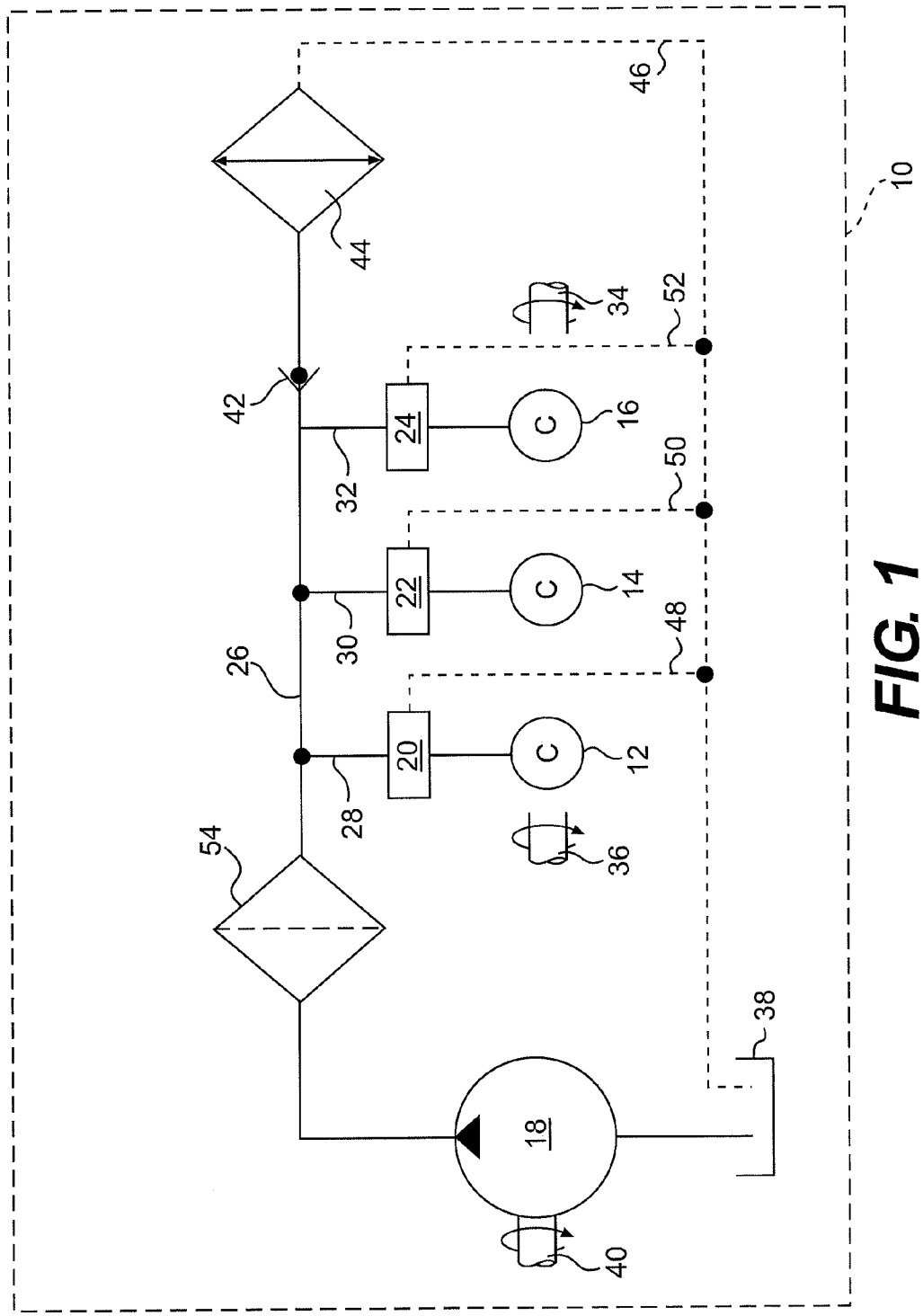
FIG. 1 is a diagrammatic illustration of an exemplary disclosed transmission that may be used in conjunction with the machine of FIG. 1.

FIG. 1 illustrates an exemplary transmission system 10 having numerous components that interact to transmit power from a power source (e.g., an engine—not shown) to a load (e.g., a traction device of a mobile machine—not shown). In the disclosed embodiment, transmission system 10 is a multi-speed, bidirectional, mechanical, step-change transmission having a plurality of fluid activated clutches and control valves. Although shown as having three clutches 12, 14, and 16 connected to a pump 18 through three control valves 20, 22, and 24, it is contemplated that additional or fewer clutches and/or control valves may be included within transmission system 10.

Clutches 12-16 may be configured to selectively receive pressurized fluid from pump 18, causing engagement of portions of a gear train (not shown) within transmission system 10. Each of clutches 12-16 may be fluidly connected to pump 18 in parallel relation by way of a common manifold 26 and individual distribution lines 28, 30, and 32, respectively. Each of clutches 12-16 may include an interior actuating chamber (not shown) that, when filled with pressurized fluid, displaces a piston (not shown), moving the piston toward one or more clutch disks (not shown) and plates (not shown) that are together known as a clutch pack. As the piston "touches up" to the clutch pack, the actuating chamber is full of fluid and the clutch is engaged. The combination of engaged clutches determines a ratio of speed versus torque of an output shaft 34 of transmission system 10 relative to an input shaft 36.

Pump 18 may draw fluid from a low pressure sump 38 and produce one or more flows of pressurized fluid. In the disclosed embodiment, pump 18 creates two flows of fluid (i.e., a low-pressure flow and a high-pressure flow—only the high-pressure flow shown in FIG. 1) having pressures of about 125 psi and 400 psi (about 862 kPa and 2758 kPa), respectively. Pump 18, in this example, is a fixed-displacement gear pump. Pump 18 may be drivably connected to the power source described above by, for example, a shaft 40, a belt (not shown), an electrical circuit (not shown), or in any other suitable manner. It is contemplated that pump 18 may alternatively be drivably connected within transmission system 10, if desired. For example, pump 18 may be located within a housing of transmission system 10 and shaft 40 may be connected to input shaft 36 by way of a gear train (not shown). Pump 18 may be dedicated to supplying pressurized fluid only to transmission system 10 or, alternatively, may supply pressurized fluid to additional machine components and/or systems.

Control valves 20-24 may be configured to regulate a flow of pressurized fluid from pump 18 into clutches 12-16. Specifically, control valves 20-24 may be disposed within distribution lines 28-32, respectively, between manifold 26 and clutches 12-16. Each of control valves 20-24 may include a three-position valve mechanism (not shown) that is solenoid actuated and configured to regulate filling and draining of one of clutches 12-16. Each of the three-position valve mechanisms may be movable between a first position at which fluid is allowed to flow into an associated clutch chamber, a second position at which fluid flow is blocked from the clutch chamber, and a third position at which fluid is allowed to drain from the clutch chamber. It is contemplated that more than one clutch may be associated with a single control valve and/or that each control valve may include additional or different mechanisms (e.g., a proportional valve element, a pilot valve element, or any other mechanisms known in the art).

A pressure relief valve 42 may be disposed downstream of manifold 26 and configured to selectively pass fluid through a cooler 44 to sump 38 in response to a pressure of the fluid within manifold 26. By way of example, pressure relief valve 42 may include a valve element that is spring biased toward a flow blocking position and movable toward a flow passing position in response to a pressure of the fluid within manifold 26. When the pressure within manifold 26 exceeds a predetermined threshold, the force generated by the fluid pressure acting on the valve element may overcome the spring force, allowing the valve element to move to the flow-passing position. In this manner, pressure relief valve 42 may function to help maintain a predetermined pressure within manifold 26 and simultaneously promote a generally unidirectional flow of fluid through transmission system 10.

Sump 38 may include a tank configured to hold a supply of fluid. The fluid may include, for example, an engine lubrication oil, a transmission lubrication oil, a separate hydraulic oil, or any other fluid known in the art. It is contemplated that transmission system 10 may be the only system or one of several systems connected to draw fluid from sump 38, as desired.

Cooler 44 may be an air-to-liquid or liquid-to-liquid type of heat exchanging device configured to cool fluid passing through transmission system 10 to a desired temperature. Cooler 44 may have no moving parts and may be less sensitive to contamination than control valves 20-24. Pressurized fluid may pass through cooler 44 and return to sump 38 via a primary return path 46. Additional pressurized fluid may pass through control valves 20-24 and return to sump 38 via individual return paths 48, 50, and 52.

In the disclosed embodiment, a filter 54 may be disposed at an upstream end of manifold 26 and configured to remove debris from the fluid of transmission system 10 before the fluid is delivered to control valves 20-24 or cooler 44. It should be noted that filter 54 may embody a single filtration element or multiple filtration elements disposed in a series and/or parallel arrangement. In the disclosed embodiment, filter 54 includes a single filtration element having a 4μ rating of about 1300-2500 ppm and a 6μ rating of about 40-80 ppm.

Figure 2:
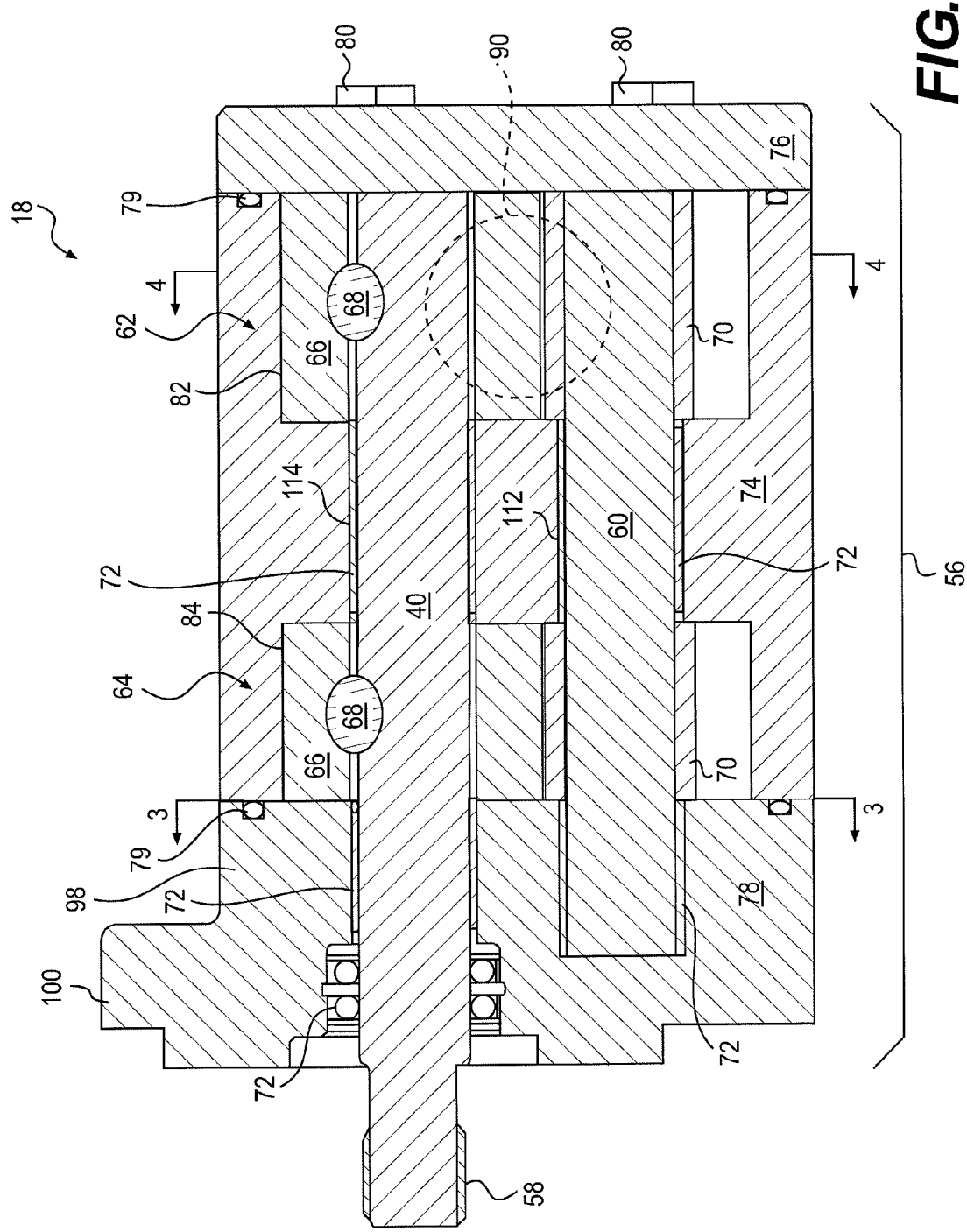
FIG. 2 is a cross-sectional illustration of an exemplary disclosed pump that may be used in conjunction with the transmission of FIG. 1.

FIG. 2 illustrates an exemplary physical embodiment of pump 18. As shown in this figure, shaft 40 may extend from one end of a housing 56, and include a splined interface 58 for connection with the power source discussed above. A countershaft 60 may also be disposed within housing 56 in parallel with shaft 40 and, together with shaft 40, support two sets of intermeshing gears. Specifically, a first set 62 of gears ("first gear set") may be located at a low-pressure end of pump 18 and a second set 64 of gears ("second gear set") may be located at a high-pressure end of pump 18. Each of first and second gear sets 62, 64 may include a drive gear 66 that is mechanically connected to rotate with shaft 40 (e.g., by way of a machined key 68), and a driven gear 70 that spins freely on countershaft 60. It is contemplated that driven gears 70 could alternatively be mechanically connected to rotate countershaft 60, if desired. It is also contemplated that gears 66, 70 of first gear set 62 could be the same as or different than (e.g., have different configurations, shapes, and/or sizes than) gears 66, 70 of second gear set 64. In the disclosed embodiment, first gear set 62 has gears 66, 70 that are different and, for this reason, first gear set 62 may produce a flow of fluid having a different flow rate and/or pressure (e.g., a lower flow rate and/or pressure) than a flow of fluid produced by second gear set 64. One or more bearings 72 may support shaft 40 and countershaft 60 along their lengths.

Housing 56 may include three separate components, for example a body 74, an end cap 76 connected at a distal end of body 74 opposite the power source, and a mounting adapter 78 connected at the proximal end of body 74. End cap 76 may be configured to close off various openings in body 74, while mounting adapter 78 may be used to mount pump 18 to, for example, the power source or a housing of transmission system 10. One or more seals 79 (e.g., o-rings) may be located between the components of housing 56, and these components may be connected to each other via one or more fasteners 80 that pass from end cap 76 through body 74 to mounting adapter 78.

Figure 3:
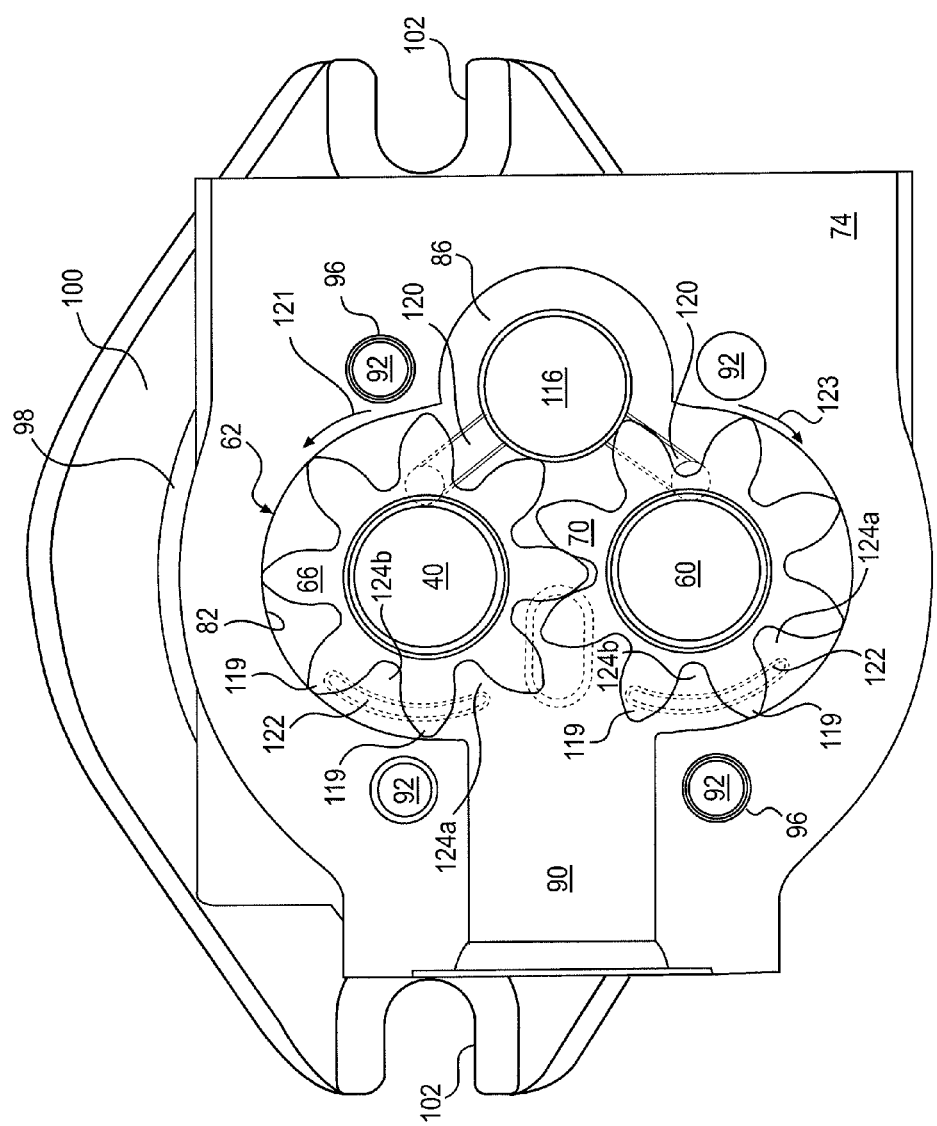
FIG. 3 is an end view illustration of a mounting adapter that may be used in conjunction with the pump of FIG. 2.

As shown in FIGS. 2 and 3, two separate gear chambers may be formed within body 74, including a low-pressure gear chamber 82 configured to house first gear set 62, and a high-pressure gear chamber 84 (shown only in FIG. 2) configured to house second gear set 64. Body 74 may also form a common inlet passage 86 (shown only in FIG. 3) that extends axially along a length of pump 18 and is in communication with a disengaging side of both of first and second gear sets 62, 64 (i.e., with both of low- and high-pressure gear chambers 82, 84), and an outlet passage 90 that extends radially from the engaging side of only first gear set 64. Two bearing bores 112, 114 (shown only in FIG. 2) may pass between low- and high-pressure gear chambers 82, 84 to provide clearance for shaft 40 and countershaft 60 and to also provide support locations for bearings 72 (referring to FIG. 2). A plurality of axial holes (shown only in FIG. 3) may pass completely through body 74 to provide clearance for fasteners 80.

End cap 76, as shown in FIG. 2, may be generally plate-like, and include a plurality of axial through holes (not shown) that align with holes 92 in body 74. In some arrangements, one or more hollow dowels 96 (shown in FIG. 3) may be placed within holes 92 of body 74 to extend into the holes of end cap 76 and receive fasteners 80. Dowels 96 may help to align end cap 76 with body 74 during assembly. It is contemplated that outlet passage 90 could alternatively be formed within end cap 76 and axially oriented instead of being radially located within body 74, if desired.

Figure 4:
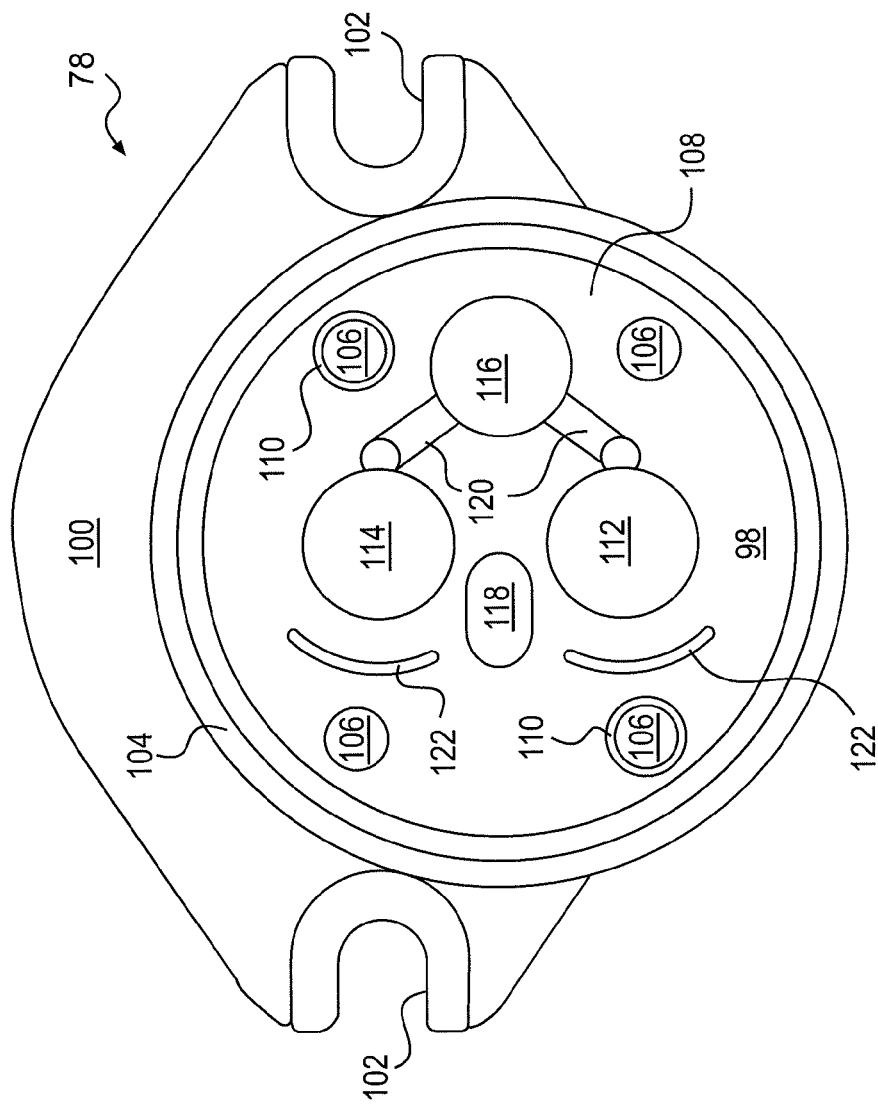
FIG. 4 is a cross-sectional end view illustration of the pump of FIG. 2.

As shown in FIG. 4, mounting adapter 78 may include a generally cylindrical base member 98, and a plate-like flange 100 connected at one end of base member 98. Flange 100 may include a plurality of mounting features 102 (e.g., ear tabs), configured to receive fasteners (not shown) that engage the power source and/or the housing of transmission system 10, thereby mounting pump 18. An outer surface 104 of base member 98 may be stepped to receive and support seal 79 (referring to FIG. 2) located between body 74 and mounting adapter 78. A plurality of holes 106 (e.g., threaded blind holes) may be formed within an axial end surface 108 of base member 98 and configured to align with holes 92 in body 74 to receive fasteners 80 that connect body 74 and end cap 76 to mounting adapter 78. In some embodiments, one or more hollow dowels 110 may be positioned within holes 106 of base member 98 that are configured to extend into holes 92 of body 74, thereby aligning mounting adapter 78 with body 74.

End surface 108 of base member 98 may be machined to include a plurality of support features and fluid passages. For example, bearing bores 112, 114 may be formed within end surface 108 to provide clearance for shaft 40 and countershaft 60, respectively, and support for the associated bearings 72. In addition, a low-pressure inlet port 116 may be formed at the engaging side of second gear set 64, and a high-pressure outlet port 118 may be formed at the disengaging side of second gear set 64. In the disclosed embodiment, inlet port 116 may have a generally round and large opening that fluidly communicates sump 38 (referring to FIG. 1) with common inlet passage 86 (see FIG. 3), while outlet port 118 may have an elliptically shaped and smaller opening that fluidly communicates only the disengaging side of high-pressure gear chamber 84 with manifold 26 (referring to FIG. 1).

Inlet port 116 may be located further away from bearing bores 112, 114 than outlet port 118. As can be seen in the overlapping images of FIG. 3, inlet port 116 may be positioned at a location where teeth 119 of gears 66, 70 have already completely disengaged each other, while outlet port 118 may be positioned at a location where teeth 119 engage each other. The sizes, shapes, and locations of these openings may facilitate desired flow rates of fluid at desired pressures into and out of the associated chambers. Two bearing drain passages 120 may connect bearing bores 112, 114 with low-pressure inlet port 116 to allow fluid to drain away from bearings 72.

As teeth 119 rotate (referring to FIG. 3), low pressure fluid from common inlet passage 86 may fill spaces 124 between adjacent teeth 119. This fluid may then be transported by drive gears 66 in a counterclockwise direction (as represented by an arrow 121 in FIG. 3) and by driven gears 70 in a clockwise direction (as represented by an arrow 123 in FIG. 3) around the respective chambers 82, 84 toward outlet passage 90 and outlet port 118. The pressure of fluid at outlet port 118 may be much higher than the pressure of the fluid within common inlet passage 86 and trapped within spaces 124 between teeth 119 during operation. Accordingly, as a particular space 124 between two adjacent teeth 119 communicates with outlet port 118, a significant pressure increase may be experienced within the fluid contained in space 124. And unless otherwise accommodated, this pressure increase could cause sudden implosions of air bubbles in the fluid that result in excessive noise, vibrations, and component damage. For this reason, a pair of bleed grooves 122 may be located at the disengaging side of second gear set 64.

As shown in FIGS. 3 and 4, bleed grooves 122 may be located generally adjacent outlet port 118 (e.g., above and below outlet port 118) at a proximal end face second gear set 64, and each may be generally concentric with an associated one of bearing bores 112, 114. In the disclosed embodiment, bleed grooves 122 are mirror images of each other across a mid-plane of outlet port 118, and radially located at a pitch line of teeth 119 of gears 66 and 70 that are mounted on shaft 40 and countershaft 60 passing through the corresponding bearing bores 112, 114. Bleed grooves 122 may each have an arc length that extends between three consecutive teeth 119. That is, bleed grooves 122 may be long enough to fluidly communicate two spaces 124a and 124b between the three consecutive teeth 119 with each other. In this position and with this length, bleed grooves 122 may be configured to bring the pressure of space 124b, which is shown as not yet being in full communication with outlet port 118, gradually up to about the same pressure as space 124a that is shown as already being at the pressure of outlet port 118. This gradual increase in pressure may function to reduce a size of the air bubbles trapped within the fluid, prior to implosion of the bubbles. This reduction may result in a smaller and less powerful implosion that causes little (if any) noise, vibration, or damage.

In the disclosed embodiment, bleed grooves 122 may be machined using a simple, square end-mill. Bleed grooves 122 may have a generally constant cross-section and depth, making the fabrication of bleed grooves 122 a relatively simple and inexpensive process. It is contemplated, however, that bleed grooves 122 could alternatively have a cross-section that varies along it's length (e.g., a varying width and/or depth) to aid in gradual pressure changes, if desired. In the example of FIG. 4, bleed grooves have a width of about 3.75-4.25 mm, a depth of about 2.5-3.0 mm, and an arc length of about 70-75°. These dimensions may be designed to accommodate a desired flow rate of fluid at about 400 psi having a contamination level based on the filtration characteristics of filter 54 when shaft 40 is being rotated at about 1800 rpm. Dimensions that deviate from these values may cause bleed grooves 122 to become clogged with debris and/or for pressure or flow characteristics to deviate from desired values. In general, a pressure-to-area ratio for bleed grooves 122 of the disclosed mounting adapter 78 may be about 0.04 N/mm$^4$ (2757.9 kPa/11 mm$^2$). In addition an arc length-to-tooth ratio may be about 9.1°/# teeth (72.5°/8 teeth). A contamination-to-depth ratio may be about 1.45 µ/mm (4µ/2.75 mm). The pressure being discharged by second gear set 64 may be about three or more times greater than the pressure being discharged by first gear set 62, hence the need for bleed grooves 122 in association with only second gear set 64.

INDUSTRIAL APPLICABILITY

The disclosed pump and mounting adapter find potential application in any fluid system where reduced noise, vibration, and damage are desired. Although shown in conjunction with a single gear chamber of a dual chamber pump, the disclosed mounting adapter could alternatively be utilized with a single chamber pump, both chambers of a dual chamber pump, or with a pump having more than two chambers, if desired. The disclosed mounting adapter may provide for gradual pressure increases within the pump that reduce the likelihood and magnitude of implosion. The reduced implosion frequency and severity may result in reduced noise, vibration, and component damage. Operation of pump 18 will now be described in detail.

During operation, a power source (e.g., the engine of a mobile machine) may rotate shaft 40 to generate one or more flows of pressurized fluid directed to another machine system (e.g., to clutches within transmission system 10—see FIG. 1). Referring to FIG. 2, the rotation of shaft 40 may cause rotation of drive gears 66 within each of low- and high-pressure gear chambers 82, 84. As drive gears 66 are caused to rotate, teeth 119 of drive gears may engage corresponding teeth 119 of driven gears 70, causing driven gears 70 to also rotate. As teeth 119 of both gears within a particular gear set disengage each other, as shown at the right side of FIG. 3, fluid from common inlet passage 86 may fill spaces 124 between teeth 119. The continued rotation of gears 66, 70 may function to transport the fluid within spaces 124 around the corresponding chambers. For example, drive gear 66 may transport the fluid in a counterclockwise direction (referring to the perspective of FIG. 3), while driven gear 70 may transport the fluid in a clockwise direction.

As a particular space 124 (e.g., 124b) comes into alignment with an end of a corresponding bleed groove 122, high-pressure fluid from a leading space 124 (e.g., 124a) may flow through bleed groove 122 into the particular space 124, thereby gradually bringing the particular space 124 up in pressure. As gears 60, 70 continue to rotate, the particular space 124 will eventually come into full communication with outlet port 118. Because the pressure within the particular space 124 was gradually increased, any air bubbles in the fluid contained in this space will have decreased in size by the time the particular space 124 comes into communication with outlet port 118. Accordingly, any implosions that occur during this communication may be smaller in size and/or less frequent.

Continued rotation of gears 60, 70 will eventually cause teeth 119 to re-engage each other, forcing fluid out of spaces 124. This fluid will be forced into outlet port 118 at a pressure dependent upon restrictions at outlet port 118 and/or within transmission system 10.

The disclosed pump and mounting adapter may allow for improved packaging in smaller spaces. Specifically, by locating bleed grooves 122 within mounting adapter 78, body 74 may be allowed to become smaller without sacrificing durability. This may increase the applicability of pump 18, and simultaneously decrease a cost of pump 18 and transmission system 10. In addition, the location of bleed grooves 122 within mounting adapter 78 may increase a strength and/or durability of body 74.

It will be apparent to those skilled in the art that various modifications and variations can be made to the disclosed pump and mounting adapter. Other embodiments will be apparent to those skilled in the art from consideration of the specification and practice of the disclosed pump and mounting adapter. It is intended that the specification and examples be considered as exemplary only, with a true scope being indicated by the following claims and their equivalents.

What is claimed is:

1. A mounting adapter for a gear pump, comprising:
a substantially cylindrical base member;
a substantially plate-like mounting flange connected to one end of the base member;
an inlet port formed in the base member;
an outlet port formed in the base member;
a first bearing bore formed in the base member between the inlet port and the outlet port and configured to receive a first gear shaft;
a first bleed groove formed in the base member adjacent the outlet port, the first bleed groove being substantially concentric with the first bearing bore;
a second bearing bore formed in the base member between the inlet port and the outlet port and configured to receive a second gear shaft;
a second bleed groove formed in the base member adjacent the outlet port, the second bleed groove being substantially concentric with the second bearing bore; and
wherein the first and second bleed grooves have an arc length of about 70-75°.

2. The mounting adapter of claim 1, wherein the first and second bleed grooves each have a substantially constant cross-section along their lengths.

3. The mounting adapter of claim 2, wherein the first and second bleed grooves have substantially square cross-sections.

4. The mounting adapter of claim 1, wherein:
the inlet port has a substantially round opening;
the outlet port has a substantially elliptical opening; and
the outlet port is located closer to the first and second bearing bores than the inlet port.

5. The mounting adapter of claim 4, wherein the outlet port is located at least partially between the first and second bearing bores.

6. The mounting adapter of claim 1, further including:
a plurality of threaded blind holes located in the base member; and
at least one hollow alignment dowel disposed within at least one of the plurality of threaded blind holes.

7. The mounting adapter of claim 1, further including first and second bearing drain passages extending from the first and second bearing bores to the inlet port.

8. The mounting adapter of claim 1, wherein the mounting flange includes a plurality of ear tabs configured to connect the mounting adapter to a power source.

9. The mounting adapter of claim 1, wherein the base member includes a stepped outer bore configured to receive an o-ring seal.

10. A gear pump, comprising:
a housing body forming a first gear chamber and a second gear chamber;
a first shaft disposed within the first gear chamber;
a first gear supported by the first shaft;
a second shaft disposed within the second gear chamber;
a second gear supported by the second shaft and configured to mesh with the first gear;
an mounting adapter removably connected to an end of the housing body to at least partially enclose the first shaft, the first gear, the second shaft, and the second gear, the mounting adapter including:
a substantially cylindrical base member;
an inlet port formed in the base member at one side of the first and second gears;
an outlet port formed in the base member at an opposing side of the first and second gears;
a first bearing bore formed in the base member between the inlet port and the outlet port and configured to receive the first shaft;
a first bleed groove formed in the base member adjacent the outlet port, the first bleed groove being substantially concentric with the first bearing bore;
a second bearing bore formed in the base member between the inlet port and the outlet port and configured to receive the second shaft;
a second bleed groove formed in the base member adjacent the outlet port, the second bleed groove being substantially concentric with the second bearing bore;
wherein the first and second bleed grooves have an arc length of about 70-75°; and
a seal disposed at an interface of the housing body and the mounting adapter.

11. The gear pump of claim 10, further including:
a third gear supported by the first shaft;
a fourth gear supported by the second shaft and configured to mesh with the third gear; and
a common inlet chamber in fluid communication with the first, second, third, and fourth gears.

12. The gear pump of claim 11, wherein the first and second gears are configured to discharge fluid at a pressure that is about three times greater than a pressurized fluid being discharged by the third and fourth gears.

13. The gear pump of claim 10, wherein the arc length of the first and second bleed grooves is about equal to a distance between three consecutive gear teeth at a pitch line of the first and second gears.

14. The gear pump of claim 13, wherein the first and second bleed grooves are in fluid communication with the outlet port at one end.

15. The gear pump of claim 14, wherein the first and second bleed grooves are located at the pitch line of the first and second gears.

16. The gear pump of claim 10, wherein a pressure-to-area ratio of the first and second bleed grooves is about 0.04 $N/mm^4$.

17. The gear pump of claim 10, wherein a length-to-tooth ratio of the first and second bleed grooves is about 9.1°/# teeth.

18. The gear pump of claim 10, wherein a contamination-to-depth ratio of the first and second bleed grooves is about 1.45 μ/mm.

19. A transmission system, comprising:
an input shaft;
an output shaft;
at least one clutch disposed between the input and output shafts, the at least one clutch being selectively actuated to adjust a speed-to-torque ratio of the output shaft relative to the input shaft;
a sump;
a pump configured to draw fluid from the sump and generate a pressurized flow of fluid directed to the at least one clutch, the pump having:
a housing body forming a first gear chamber and a second gear chamber;
a first shaft supporting a first gear within the first gear chamber;
a second shaft supporting a second gear within the second gear chamber; and
a mounting adapter removably connected to an end of the housing body and including:
a substantially cylindrical base member connected to the housing body;
a substantially plate-like mounting flange connected to an end of the base member and configured to mount the base member within the transmission;
an inlet port formed in the base member at one side of the first and second gears;
an outlet port formed in the base member at an opposing side of the first and second gears;
first and second bearing bores formed in the base member between the inlet and outlet ports and configured to receive the first and second shafts, respectively;
first and second bleed grooves formed in the base member adjacent the outlet port, the first and second bleed grooves being substantially concentric with the first and second bearing bores, respectively;
wherein the first and second bleed grooves have an arc length of about 70-75°; and
a seal disposed at an interface of the housing body and the mounting adapter.

20. A gear pump, comprising:
a housing body forming a first gear chamber and a second gear chamber;
a first shaft disposed within the first gear chamber;
a first gear supported by the first shaft;
a second shaft disposed within the second gear chamber;
a second gear supported by the second shaft and configured to mesh with the first gear;
an mounting adapter removably connected to an end of the housing body to at least partially enclose the first shaft, the first gear, the second shaft, and the second gear, the mounting adapter including;
a substantially cylindrical base member;
an inlet port formed in the base member at one side of the first and second gears;
an outlet port formed in the base member at an opposing side of the first and second gears;
a first bearing bore formed in the base member between the inlet port and the outlet port and configured to receive the first shaft;
a first bleed groove formed in the base member adjacent the outlet port, the first bleed groove being substantially concentric with the first bearing bore;
a second bearing bore formed in the base member between the inlet port and the outlet port and configured to receive the second shaft;
a second bleed groove formed in the base member adjacent the outlet port, the second bleed groove being substantially concentric with the second bearing bore;
wherein a pressure-to-area ratio of the first and second bleed grooves is about 0.04 N/mm$^4$; and
a seal disposed at an interface of the housing body and the mounting adapter.

21. A gear pump, comprising:
a housing body forming a first gear chamber and a second gear chamber;
a first shaft disposed within the first gear chamber;
a first gear supported by the first shaft;
a second shaft disposed within the second gear chamber;
a second gear supported by the second shaft and configured to mesh with the first gear;
an mounting adapter removably connected to an end of the housing body to at least partially enclose the first shaft, the first gear, the second shaft, and the second gear, the mounting adapter including:
a substantially cylindrical base member;
an inlet port formed in the base member at one side of the first and second gears;
an outlet port formed in the base member at an opposing side of the first and second gears;
a first bearing bore formed in the base member between the inlet port and the outlet port and configured to receive the first shaft;
a first bleed groove formed in the base member adjacent the outlet port, the first bleed groove being substantially concentric with the first bearing bore;
a second bearing bore formed in the base member between the inlet port and the outlet port and configured to receive the second shaft;
a second bleed groove formed in the base member adjacent the outlet port, the second bleed groove being substantially concentric with the second bearing bore;
wherein a length-to-tooth ratio of the first and second bleed grooves is about 9.1°/# teeth; and
a seal disposed at an interface of the housing body and the mounting adapter.

22. A gear pump, comprising:
a housing body forming a first gear chamber and a second gear chamber;
a first shaft disposed within the first gear chamber;
a first gear supported by the first shaft;
a second shaft disposed within the second gear chamber;
a second gear supported by the second shaft and configured to mesh with the first gear;
an mounting adapter removably connected to an end of the housing body to at least partially enclose the first shaft, the first gear, the second shaft, and the second gear, the mounting adapter including:
a substantially cylindrical base member;
an inlet port formed in the base member at one side of the first and second gears;
an outlet port formed in the base member at an opposing side of the first and second gears;
a first bearing bore formed in the base member between the inlet port and the outlet port and configured to receive the first shaft;
a first bleed groove formed in the base member adjacent the outlet port, the first bleed groove being substantially concentric with the first bearing bore;
a second bearing bore formed in the base member between the inlet port and the outlet port and configured to receive the second shaft;
a second bleed groove formed in the base member adjacent the outlet port, the second bleed groove being substantially concentric with the second bearing bore;
wherein a contamination-to-depth ratio of the first and second bleed grooves is about 1.45 μ/mm; and
a seal disposed at an interface of the housing body and the mounting adapter.

* * * * *